(12) United States Patent
Roussel

(10) Patent No.: US 7,774,659 B2
(45) Date of Patent: Aug. 10, 2010

(54) METHOD OF MONITORING THE CORRECT OPERATION OF A COMPUTER

(75) Inventor: Pierre Roussel, Toulouse (FR)

(73) Assignee: Thales (FR)

( * ) Notice: Subject to any disclaimer, the term of this patent is extended or adjusted under 35 U.S.C. 154(b) by 395 days.

(21) Appl. No.: 12/066,804

(22) PCT Filed: Sep. 4, 2006

(86) PCT No.: PCT/EP2006/065982

§ 371 (c)(1),
(2), (4) Date: Mar. 13, 2008

(87) PCT Pub. No.: WO2007/031426

PCT Pub. Date: Mar. 22, 2007

(65) Prior Publication Data

US 2008/0215927 A1   Sep. 4, 2008

(30) Foreign Application Priority Data

Sep. 16, 2005   (FR) .................................. 05 09496

(51) Int. Cl.
*G06F 11/00* (2006.01)

(52) U.S. Cl. ............................. 714/55; 714/39; 714/51; 714/36; 711/153; 718/107

(58) Field of Classification Search ....................... None
See application file for complete search history.

(56) References Cited

U.S. PATENT DOCUMENTS

| | | | | |
|---|---|---|---|---|
| 5,471,488 A * | 11/1995 | Bender | ......................... | 714/55 |
| 5,517,643 A * | 5/1996 | Davy | ........................... | 718/105 |
| 5,644,709 A * | 7/1997 | Austin | ........................... | 714/53 |
| 5,918,049 A * | 6/1999 | Syvaniemi | ................... | 718/104 |
| 6,263,478 B1 * | 7/2001 | Hahn et al. | .................... | 716/10 |
| 6,301,616 B1 * | 10/2001 | Pal et al. | ..................... | 709/226 |
| 6,988,226 B2 * | 1/2006 | Koning et al. | ................. | 714/57 |
| 7,228,545 B2 * | 6/2007 | Circenis et al. | ............. | 718/102 |
| 7,406,522 B2 * | 7/2008 | Riddle | ......................... | 709/226 |
| 2005/0055697 A1 * | 3/2005 | Buco et al. | ................... | 718/105 |
| 2007/0061788 A1 * | 3/2007 | Dodge et al. | ................ | 717/140 |
| 2007/0061807 A1 * | 3/2007 | Bibby | ......................... | 718/102 |
| 2009/0217280 A1 * | 8/2009 | Miller et al. | ................ | 718/104 |

FOREIGN PATENT DOCUMENTS

FR   2 682 202   4/1993
FR   2 770 917   5/1999

* cited by examiner

*Primary Examiner*—Christopher S McCarthy
(74) *Attorney, Agent, or Firm*—Lowe Hauptman Ham & Berner, LLP

(57) ABSTRACT

The present invention relates to computers executing in time-share mode, under the control of their operating systems, a number of separate and independent application programs. The present invention relates in particular to the networks of onboard computer networks of IMA type executing application programs written independently of the hardware specifications of the computers and not permanently resident in the computers. The method of the present invention associates with the digital core of each computer of the network a monitoring state machine operating independently and in having the monitoring state machine monitor the correct observance by the associated computer of the time sequencing of the tasks and memory partition allocations. Furthermore, the monitoring state machines can be configured to execute monitoring service applications of time-out or watchdog type to which the application programs executed by the computers of the network can subscribe.

16 Claims, 2 Drawing Sheets

METHOD OF MONITORING THE CORRECT OPERATION OF A COMPUTER

CROSS-REFERENCE TO RELATED APPLICATIONS

The present Application is based on International Application No. PCT/EP2006/065982, filed on Sep. 4, 2006, which in turn corresponds to French Application No. 05 09496 filed on Sep. 16, 2005, and priority is hereby claimed under 35 USC §119 based on these applications. Each of these applications are hereby incorporated by reference in their entirety into the present application.

FIELD OF THE INVENTION

The present invention relates to computers executing in time-share mode, under the control of their operating systems, a number of separate and independent applications partitioned into tasks. It relates in particular to the onboard computer networks of IMA (Integrated Modular Avionics) type which consist of interchangeable computers assembled in a network, executing application programs written independently of the hardware specifications of the computers and not permanently resident in the computers.

BACKGROUND OF THE INVENTION

Piloting an aircraft entails executing a certain number of actuator control and display operations deduced from mathematical modelings of the behavior of the aircraft and of certain of its subassemblies which are implemented by computers and which take account of the current values of the flight parameters and of the instructions from the crew.

At first, the computers on board an aircraft each had a specific configuration adapted to a modeling appropriate to a particular type of operation: piloting functions, flight management functions, alarm management functions, and so on. This architecture very quickly proved disadvantageous for maintenance because it entails managing a large base of spare computers that are dedicated and not interchangeable.

To facilitate maintenance, research efforts are focused on combining the onboard computers within one and the same technical cabinet, adopting one and the same architecture for the majority of them and dedicating them only at the level of their inputs/outputs which have been made interchangeable and of their programming, that is, the computations or applications that they execute. This leads to the concept of IMA computer network.

Since task execution errors within an application and their propagation to other applications executed concurrently can have particularly disastrous consequences in the context of the piloting of an aircraft, measures to immunize against their occurrence must be taken in the context of an IMA computer network. These immunization measures consist in providing the various applications with tasks for monitoring correct execution and in having one and the same application run on several identical computers operating independently, one of them having control and the other computer(s) running the same application in mirror mode to take over control in case of detection of an error in the execution of the application by the computer that is currently in control.

The task for monitoring the correct execution of an application usually consists in periodically sending questions with agreed responses to the application being monitored and checking the accuracy of the responses given.

This method has the drawback of running counter to the portability of the applications because it requires account to be taken, when an application is being designed, of the architecture of the computer required to execute it. In practice, the search for agreed responses to the questions asked by the monitoring task has to involve as many elements as possible of the computer for the monitoring to be effective.

SUMMARY OF THE INVENTION

An object of the present invention is a monitoring the proper operating condition of a computer at the level of its operating system, in order to safeguard the portability of the applications that it executes.

The invention relates to a method for monitoring the proper operating condition of a computer comprising a digital core executing in time-share mode a number of separate and independent application programs partitioned into tasks, under the control of an operating system allocating memory partitions, time windows for executing application programs and time subwindows for executing tasks organized in frames. Said monitoring method comprising:

associating with the computer a hardwired monitoring state machine operating independently of the digital core of the computer, on initialization of the operating system of the computer, having the digital core of the computer transmit to the monitoring state machine a definition of the time window and subwindow frames and of the memory partition allocations, having the digital core of the computer signal to the monitoring state machine each change of time window, having the digital core of the computer communicate to the monitoring state machine, on each change of memory partition allocation, the identity of the memory partition that has been left, the start and end times of the allocation of the memory partition that has been left and the order number, within a time window, of the time subwindow in which the allocation of the memory partition that has been left occurred, based on change of memory partition allocation indications delivered by the digital core of the computer, having the monitoring state machine monitor the compliance of the computer with the frames of the time windows for executing application programs and time subwindows for executing tasks, and with the memory partition allocations that it supplied on initialization of its operating system, and having the monitoring state machine transmit a malfunction alarm on each inconsistency detected between the indications from the digital core of the computer and the definitions of the frame of the time windows and subwindows for executing application programs and tasks, and of the memory partition allocations received on initialization of the operating system of the computer.

Advantageously, the digital core of the computer and the monitoring state machine that is associated with it are provided with independent clocks.

Advantageously, on each change of time window for executing application programs, the monitoring state machine tests the drift of its clock relative to that of the digital core of the computer, resynchronizes its clock on that of the computer if the drift remains within an arbitrary tolerance window and transmits a malfunction alarm otherwise.

Advantageously, the arbitrary tolerance window used for a clock-drift test has a width of the order of a tenth of the duration of a time window.

Advantageously, provision is made for establishing, for the application programs executed by the computer, a system for optionally subscribing to programmable monitoring service applications executed by the monitoring state machine.

Advantageously, the programmable monitoring service applications executed by the monitoring state machine are parameterized on initialization of the operating system of the computer.

Advantageously, the programmable monitoring service applications executed by the monitoring state machine apply their monitoring to the input/output ports of the computer.

Advantageously, the programmable monitoring service applications executed by the monitoring state machine are of time-out type.

Advantageously, the programmable monitoring service applications executed by the monitoring state machine are of watchdog type.

Advantageously, the malfunction alarms transmitted are used to reinitialize the application program originating the alarm.

Advantageously, the malfunction alarms transmitted are used to reinitialize the operating system of the computer.

Advantageously, when the digital core of the computer is provided with a non-maskable interrupt system, the malfunction alarms transmitted by the monitoring state machine that is associated with it are used to reinitialize it, after a certain delay, via a non-maskable interrupt, the delay being exploited to save the context of the malfunction.

Advantageously, when the computer is linked to a maintenance device, the malfunction alarms transmitted by the monitoring state machine are used to send a failure report to the maintenance device.

Advantageously, when the computer is part of a network of computers equipped with individual monitoring state machines, the malfunction alarms transmitted by the individual monitoring state machines of the various computers are used to send to the other computers malfunction semaphores mentioning the computer or computers concerned.

Advantageously, a malfunction semaphore mentions, in addition to the computer concerned, the application program involved in the malfunction.

Advantageously, when the application programs are executed in parallel, redundantly, on several computers which are individually equipped with monitoring state machines and one of which has taken over control, the others operating in background mirror mode, the malfunction alarms transmitted by the individual monitoring state machines of the various computers are analyzed to withdraw, for the application program affected by an alarm, the computer originating this alarm and to replace it, if it is responsible for this application program, with a computer previously operating in background mirror mode, which then takes over control for the application program concerned.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENT

Figure 1:
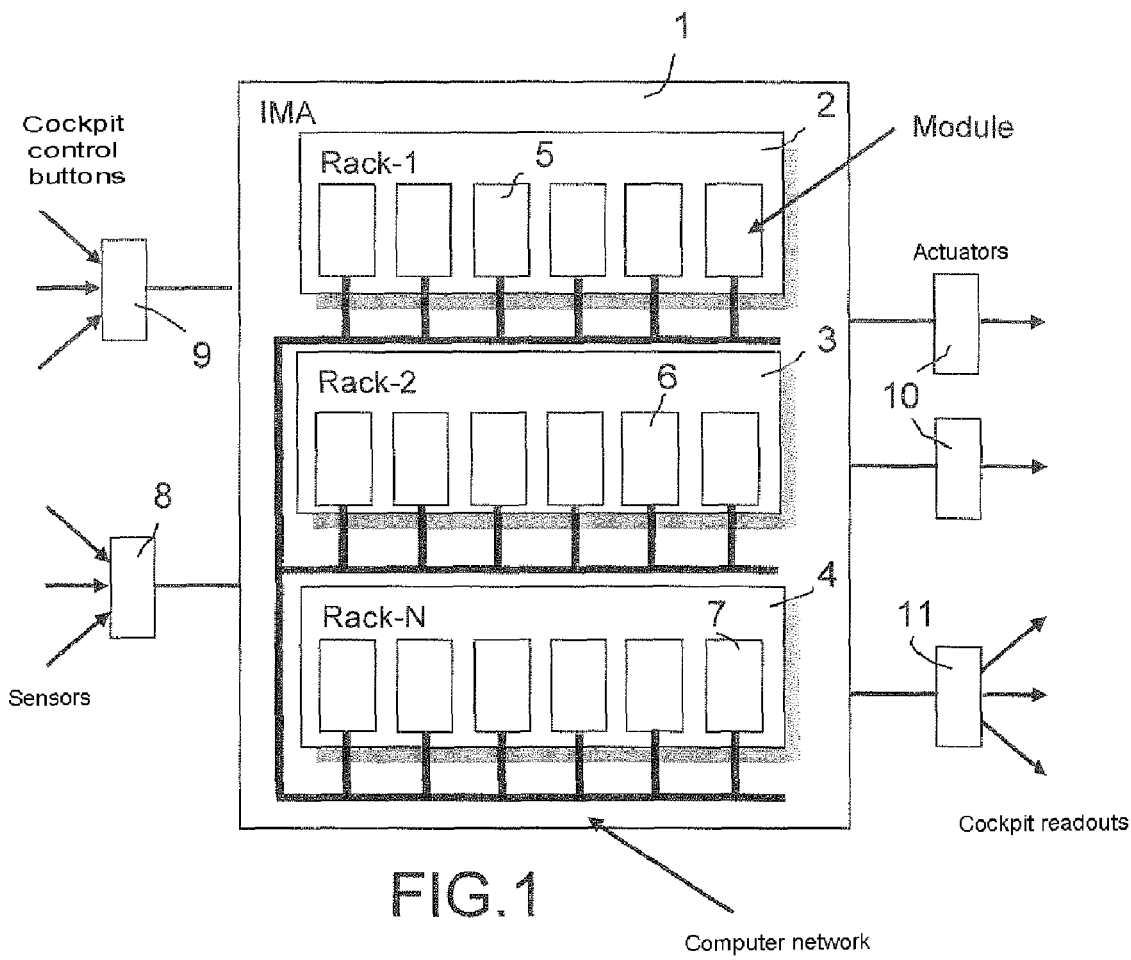
FIG. 1 is a diagram schematically illustrating the architecture of a network of IMA computers, FIG. 2 schematically illustrates the layered structure of the software governing the operation of a computer card or IMA module.

As shown in FIG. 1, an IMA-type computer network 1 combines, in one or more racks 2, 3, 4, computer cards or modules 5, 6, 7 . . . based on microprocessor, random-access memory and read-only memory components, linked by a common communication network, on the one hand, to inputs for signals originating from sensors 8 (normal and dynamic pressure sensors, inertial sensors, etc.), making it possible to determine the attitude of the aircraft, the movement parameters of the aircraft and its location (radar, satellite positioning receivers, and so on) or control buttons 9 in the cockpit operated by the crew of the aircraft and, on the other hand, to outputs for signals addressed to actuators 10 or readouts 11 in the cockpit.

The computer cards or modules are standard cards of a limited number of types dependent on their specializations: analog signal processing, digital signal processing, graphic signal processing, and so on. They constitute physical machines associated with virtual machines which are coherent software sets making it possible to use them.

Figure 2:
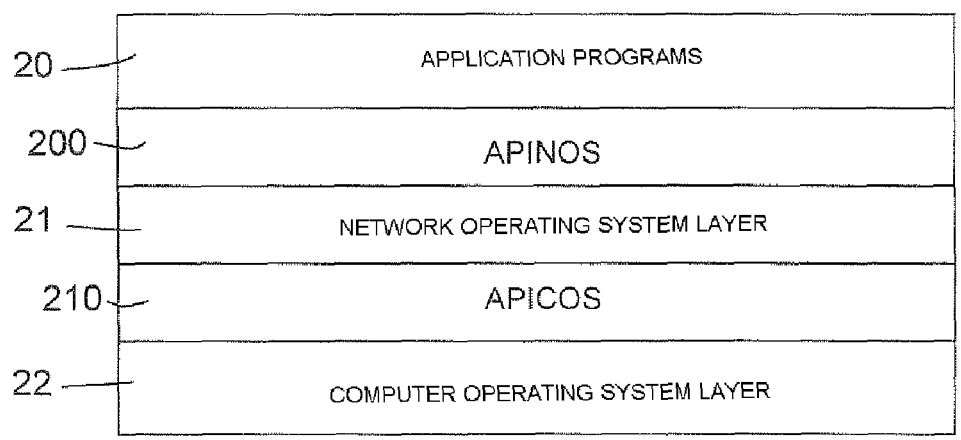

As shown in FIG. 2, a multiple-layered software approach makes it possible, in an IMA computer network, to render the technology transparent to the application programs.

The application programs, which constitute a first software layer 20, are formatted for assimilation by a second software layer 21 consisting of a network operating system via a first APINOS (Application Network Operating System) software interface 200 handling a suite of services required for the functionalities of the network operating system. After they have been assimilated by the second software layer 21 of the network operating system, the application programs are once again formatted for assimilation by a third software layer 22 consisting of a computer operating system via a second APICOS (Application Calculator Operating System) software interface 210 handling a suite of services required for the functionalities of the computer operating system.

The second software layer 21 of the network operating system handles the allocation of the tasks between the computer cards 5, 6, 7 in the network and avoids the need for the application programs to have to be permanently resident in the memories of the computer cards or modules 5, 6, 7. On initialization, it allocates the executions of the application programs between the various computer cards according to a pre-planned scheduling and stored, for example, in a mass memory then ensures that the adopted scheduling is correctly observed. However, this layer can be limited in simplified architectures to managing only the tasks on a single computer.

The third software layer 22 of a computer operating system interprets the application programs 1 according to the particular features of the physical machine corresponding to the computer card concerned.

More generally, these software layers make it possible to manage the resources of the physical machine of a computer card or module by handling the sharing of the resources of the computer card or module between a more or less large number of users consisting of application programs. It generally comprises a core handling the following functionalities:

- task management,
- file management,
- input/output port management,
- memory management,
- task, interrupt, semaphore, etc. management and a set of system tools.

Thanks to the three software layers 20, 21, 22, the application programs can be written in programming languages without regard to the particular features of the architecture of the network and of the computer cards that it contains. A first compilation by the software interface 200 adapts them to the network operating system which depends on the architecture of the network and a second compilation by the software interface 210 adapts them to the computer operating systems of the computer cards or modules to which their execution has been assigned.

During an initialization phase, the network operating system defines, at the network level, the allocation of the executions of the application programs between the various computer cards and, at the level of each computer card, the time sequencing of the tasks of the application programs and memory partition allocations.

The network and computer operating systems enable multitasking and multiple users at the level of a computer card or module of the IMA network. At the level of a computer card or module, they comprise a task manager or allocator which, on initialization of the network, schedules a time sequencing of the tasks and of the memory partition allocations of the computer card concerned, and which, during operation, ensures that the computer card concerned correctly observes the time sequencing and memory partition allocations that have been scheduled.

Figure 3:
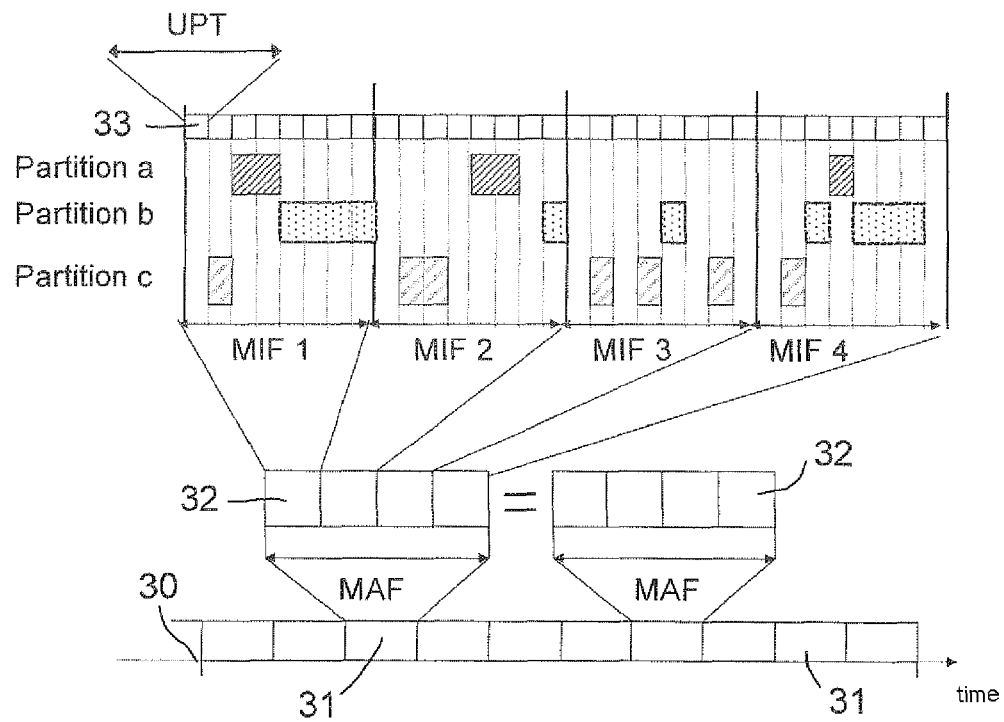
FIG. 3 is a time diagram showing an exemplary memory partition allocation frame for a computer card or IMA module.

FIG. 3 gives an example of time sequencing and memory partition allocations supplied to a computer card. The time sequencing complies with a frame 30 consisting of a succession of several time windows MAF 31 subdivided into a succession of time subwindows MIF 32, which are in turn subdivided into time partition units UPT 33. The time windows MAF 31 all have the same duration, as do the time subwindows MIF 32, whereas the time partitions UPT can have different time durations.

The time windows MAF 31 are allocated to application programs executed in time-share mode, their time subwindows MIF 32 are allocated to tasks called by the application programs allotted the time window MAF 31 to which they belong and the time partition units UPT 33 are allocated to processes called by the tasks allotted the time subwindow MIF 32 to which they belong.

In the example represented, each time window MAF 31 contains a subframe of four subwindows MIF 32 of the same duration, giving the possibility of executing in time-share mode four separate tasks, and each subwindow MIF 32 contains a succession of eight time partition units UPT 33 of the same duration, giving the possibility of executing, in time-share mode, eight separate processes. The memory partition allocation table 4 contains three partitions: the partition a represented with dark shading, the partition b represented with light shading and the partition c represented with chevron texture, that the processes share.

Redundancy is used in an effort to protect the executions of the application programs involved in the vital functions of an aircraft. This protection consists in having one and the same application program executed in parallel on several computer cards, normally two of different configurations, only one having control on the outputs, the other or others operating in mirror mode, and in monitoring the correct execution of the application program at the level of the computer cards, the detection of an execution error resulting in the sidelining of the computer card concerned which, if it has control on the outputs of the network, leaves it to one of the computer cards operating in mirror mode.

Generally, the portability of the application programs in an IMA-type computer network structure prohibits a direct monitoring of the execution of an application program by a computer card. To overcome this prohibition, it is possible to use, at the level of each computer card, the execution of a second monitoring application program which regularly exchanges data with the application program whose execution is being monitored and either analyzes the validity of the returned data, or transmits it for analysis to another computer card executing a validation program. Such a method has the drawback of using the computing power of a computer card to the detriment of the number of executions of the application programs.

It is proposed here to achieve a monitoring of a computer network that ensures the portability of the application programs being executed, such as an IMA computer network, without using monitoring programs that consume the computing time of a computer card executing application programs.

The principle is as follows: each digital core of a computer card has individually associated with it a hardwired monitoring state machine, operating independently, of the watchdog type. This monitoring state machine can be located in the computer card. It is as independent as possible of the digital core of the computer card that supports the application programs in order to have the minimum possibility of common failure, this minimum being reduced for example to power supply failures only.

During the initialization phase and before the start of the time sequencing of the application programs, the network operating system of a computer card transmits, to the monitoring state machine individually associated with the digital core of the computer card concerned, the following data:

- the timing of the time subwindows MIF or real time clock (change of time subwindow MIF instants),
- the timing of the time windows MAF which is a frequency submultiple of the real time clock (time window MAF change instants),
- for each of the time subdivisions corresponding to a memory partition allocation, the identity of the partition, the time start point of the memory partition allocation relative to the start of the time window MAF in which it occurs, the time end point of the memory partition allocation relative to the start of the time window MAF in which it occurs, and the relative position of the subwindow MIF in which it occurs relative to the other time subwindows MIF belonging to the same time window MAF.

This data enables a monitoring state machine to have, from the end of the initialization sequence, a complete knowledge of the sequence of allocation of the resources of its computer card, which it copies into an independent memory that it alone manages.

From the start of the task manager of the network and computer operating systems, the digital core of the computer of a card or module signals to its monitoring state machine, by means of a special code, each start of time window MAF devoted to the execution of an application program. Furthermore, it transmits to it, on each change of memory partition allocation, the data relating to its last executed memory partition allocation, namely: its identity, its actual start and end times, and the order number, within a time window MAF, of the time subwindow MIF in which the allocation of the memory partition that has been left occurred.

The monitoring state machine uses this data and the sequence of allocation of the resources stored in its private memory to monitor, in relation to a local clock that is specific to it and independent of that of the computer operating system, the execution of the time allocation sequence by the computer operating system of its computer card or module. In addition to monitoring the correct execution of the allocation sequence, the monitoring state machine checks the dynamic date consistency by comparing each end of subwindow MIF date declared by the computer operating system with the date of reception read on its local clock (with an allowed and preprogrammed tolerance). If an appointment is missed or incorrect, the execution of the application program associated with the current time window MAF is considered to be about to fail and a sanction is taken by the monitoring state machine. The sanction taken depends on the criticality of the computer card or module concerned. It can be:
  an instantaneous reset of the computer card,
  a transmission of a non-maskable interrupt culminating in a reset of the computer card after a certain time delay, which enables the operating system of the computer to save, when it is capable of doing so, the context of the error before undergoing a reset,
  an indication of the computer card with a problem to the other computer cards in the network by means of a malfunction semaphore having a Boolean value assigned to a fault.

Since the clocks of the computer operating system and of the monitoring state machine of a computer card are independent, a drift can occur between the two over time and justify a resynchronization. For this resynchronization, the monitoring state machine is based on the occurrence of a change of time window MAF message sent by the computer operating system of the card. It checks that this message arrives within a time window of predetermined width, for example +/−10% of that of a time window MAF, centered on its expected position relative to its own clock. If it does, the state machine resynchronizes its clock on the change of time window MAF message received from the computer operating system of its card. If it does not, a sanction is taken by the monitoring state machine according to the criticality of its computer card (card reset, transmission of a non-maskable interrupt resulting in a reset after a certain time delay, fault indication, etc.).

This monitoring of the correct execution of application programs by the computer cards or modules of an IMA network can be refined by adding to the second APICOS software interface 210 one or more service applications dedicated to monitoring the correct operation, to which the application programs can subscribe and whose execution is entrusted to the monitoring state machine of the digital core of each computer card. A monitoring service application can be a time-out type application, any subscribing application program needing periodically to produce a particular event whose occurrence at the right time is observed by the monitoring state machine or a watchdog type application, any application program needing to respond in the appropriate way to questions sent periodically by the monitoring state machine.

The configuration parameters of the action modes and of the sanctions inflicted by these monitoring service applications of the APICOS software interface are placed in a configuration table of the computer card comprising the monitoring state machine likely to execute them.

An application program subscribes to a monitoring service application by presenting, during the network initialization phase, a subscription request to a communication port of the monitoring state machine or machines of the computer card or cards responsible for its execution. Once the request has been made, it can no longer be revoked. The monitoring state machine or machines execute the monitoring service application concerned in the background and apply, if a fault is detected, the sanction stipulated in the configuration parameters. The sanction taken by a monitoring state machine while executing a monitoring service application depends on the criticality of the application program being monitored with respect to the operation of the computer card associated with the monitoring state machine.

When the application program being monitored is considered critical with respect to the operation of the module, the sanction taken by a monitoring state machine following an absence of appropriate response to a monitoring service application can be, as previously:
  an instantaneous reset of the computer card associated with the monitoring state machine,
  a transmission of a non-maskable interrupt culminating in a reset of the computer card associated with the monitoring state machine after a certain time delay, which enables the operating system of the computer to save, when it is capable of doing so, the context of the error before undergoing a reset,
  an indication of the computer card with the problem to the other computer cards of the network by means of a malfunction semaphore identifying not only the faulty computer card but also the application program whose operation is the origin of the malfunction.

When the application program being monitored has to undergo a sanction but its execution fault does not affect the rest of the operation of the computer card associated with the monitoring state machine, the sanction can be dealt with by the network and computer operating systems of this card. It can consist in a reset or a definitive stoppage of the execution of the application program concerned with simultaneous withdrawal of its subscription to the monitoring service applications. This subscription will be taken up again by the application program itself when its execution restarts.

The withdrawal of a subscription of an application program to a correct execution monitoring service application can also occur at the initiative of the network and computer operating systems of a computer card when the latter provoke the reset of an application program after having detected by themselves an execution fault or having received a command to stop the execution of an application program.

Figure 4:
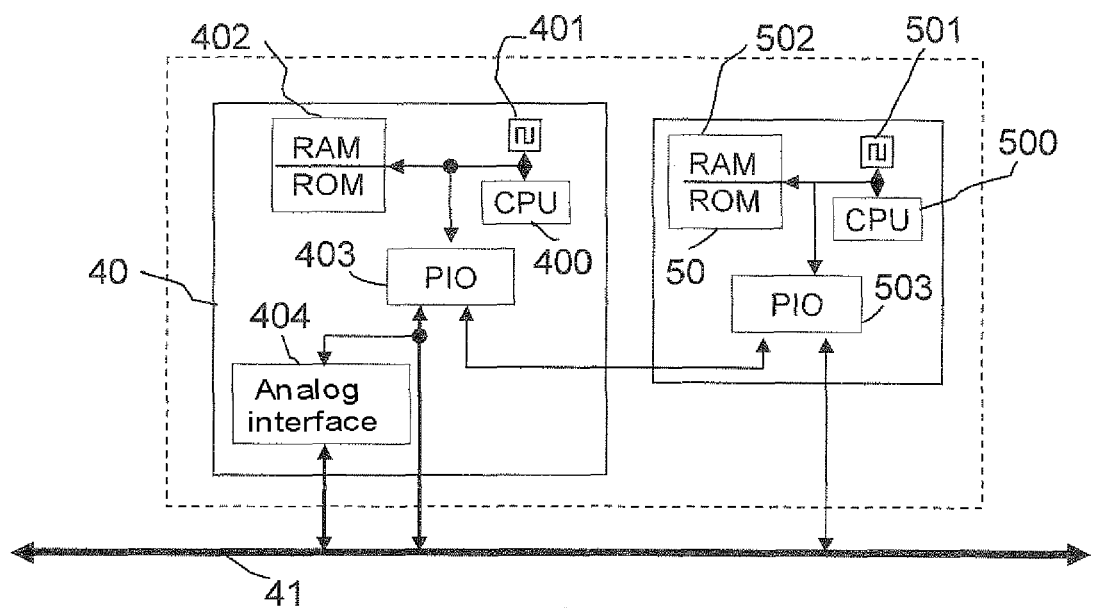
FIG. 4 is a diagram of a computer card architecture implementing the method according to the invention.

FIG. 4 gives an example of a computer card or module of an IMA network equipped with a hardwired individual state machine for monitoring correct operation. Distinguishable therein are the usual computer part 40 with a processor 400 associated with a clock 401, working and programming memories, respectively RAM and ROM, 402, input/output ports PIO 403 giving the computer part of the card access to the communication buses 41 of the computer network, and an analog interface 404 enabling the computer part of the card to process analog information originating from sensors and to give analog settings to actuators connected to the computer network by links of the communication bus 41. Of course, the computer part of a card can comprise a number of processors of different types dialoging between themselves or even dedicated logic circuits such as timers.

The computer part proper 40 of a computer card or module of an IMA network is complemented by a hardwired individual state machine 50 for monitoring its correct operation. This state machine 50 is, like the computer part 40, based on a processor 500 associated with a clock 501, working and programming memories, respectively RAM and ROM, 502, and input/output ports PIO 503, but it has a much reduced computing capability and is limited to monitoring logic signals appearing on the input/output ports PIO 403 of the computer part. However, the processor 500 can be replaced by a state machine of hardwired type implemented in an ASIC or a programmable component. It is linked to the communication bus of the network to indicate an application program execution fault by the computer part of the card. For the correct operation monitoring function, it scans the input/output ports PIO 403 of the computer part of the card in which it is fitted, either directly or via the communication bus 41 of the IMA computer network.

When the IMA computer network includes a maintenance device, the malfunction alarms from the monitoring state machines of the various computer cards are communicated to it to prepare a failure report.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for monitoring the proper operating condition of a computer comprising a digital core executing in time-share mode a number of separate and independent application programs partitioned into tasks, under the control of an operating system allocating memory partitions, time windows (MAF) for executing application programs and time subwindows (MIF) for executing tasks organized in frames, the method comprising the steps of:
associating with the digital computer core a hardwired monitoring state machine operating independently of the digital computer core,
on initialization of the operating system of the computer, transmitting by the digital computer core to the monitoring state machine a definition of the time window and subwindow frames (MAF, MIF) and of the memory partition allocations,
signaling by the digital computer core to the monitoring state machine each change of time window (MAF),
communicating by the digital computer core to the monitoring state machine, on each change of memory partition allocation, the identity of the memory partition that has been left, the start and end times of the allocation of the memory partition that has been left and the order number, within a time window (MAF), of the time subwindow (MIF) in which the allocation of the memory partition that has been left occurred,
based on change of memory partition allocation indications delivered by the digital computer core, monitoring by the monitoring state machine the compliance of the computer with the frames of the time windows (MAF) for executing application programs and time subwindows (MIF) for executing tasks, and with the memory partition allocations that it supplied on initialization of the operating system, and
transmitting by the monitoring state machine a malfunction alarm on each inconsistency detected between the indications from the digital computer core and the definitions of the frame of the time windows and subwindows (MAF, MIF) for executing application programs and tasks, and of the memory partition allocations received on initialization of the operating system.

2. The method as claimed in claim 1, wherein the digital computer core and the monitoring state machine are provided with independent clocks.

3. The method as claimed in claim 2, wherein, on each change of time window (MAF) for executing application programs, the monitoring state machine tests the drift of its clock relative to that of the digital computer core, resynchronizes its clock on that of the computer if the drift remains within an arbitrary tolerance window and transmits a malfunction alarm otherwise.

4. The method as claimed in claim 3, wherein the arbitrary tolerance window has a width of the order of a tenth of the duration of a time window (MAF).

5. The method as claimed in claim 1, further comprising establishing, for the application programs executed by the computer, a system for optionally subscribing to programmable monitoring service applications executed by the monitoring state machine.

6. The method as claimed in claim 5, wherein the programmable monitoring service applications executed by the monitoring state machine are parameterized on initialization of the operating system of the associated digital computer core.

7. The method as claimed in claim 5, wherein the programmable monitoring service applications executed by the monitoring state machine apply their monitoring to the input/output ports of the computer.

8. The method as claimed in claim 5, wherein the programmable monitoring service applications executed by the monitoring state machine are of time-out type.

9. The method as claimed in claim 5, wherein the programmable monitoring service applications executed by the monitoring state machine are of watchdog type.

10. The method as claimed in claim 1, wherein the malfunction alarms transmitted are used to reinitialize the application program originating the alarm.

11. The method as claimed in claim 1, wherein the malfunction alarms transmitted are used to reinitialize the operating system of the computer.

12. The method as claimed in claim 11, wherein, in the case of a digital computer core provided with a non-maskable interrupt system, the malfunction alarms transmitted by the monitoring state machine are used to reinitialize said digital computer core, after a certain delay, via a non-maskable interrupt, the delay being exploited to save the context of the malfunction.

13. The method as claimed in claim 1, further comprising: when the computer is linked to a maintenance device, in analyzing the malfunction alarms transmitted by the monitoring state machine, to send a failure report to the maintenance device.

14. The method as claimed in claim 1, further comprising: when the computer is part of a network of computers equipped with individual monitoring state machines, in analyzing the malfunction alarms transmitted by the individual monitoring state machines of the various computers to send to the other computers malfunction semaphores mentioning the computer or computers concerned.

15. The method as claimed in claim 14, wherein a malfunction semaphore mentions, in addition to the computer concerned, the application program involved in the malfunction.

16. The method as claimed in claim 1, further comprising: when the application programs are executed in parallel, redundantly, on several computers which are individually equipped with monitoring state machines and one of which has taken over control, the others operating in background mirror mode, in analyzing the malfunction alarms transmitted by the individual monitoring state machines of the various computers to withdraw, for the application program affected by an alarm, the computer originating this alarm and to replace it, if it is responsible for this application program, with a computer previously operating in background mirror mode, which then takes over control for the application program concerned.

* * * * *